W. W. MOYER.
STYLUS FOR SOUND REPRODUCING MACHINES.
APPLICATION FILED JAN. 15, 1916.
1,251,908.
Patented Jan. 1, 1918.
2 SHEETS—SHEET 1.
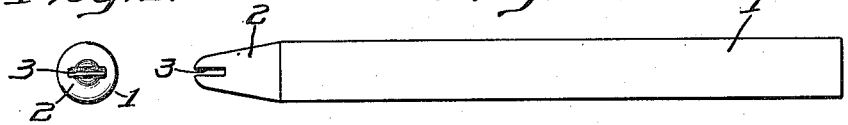
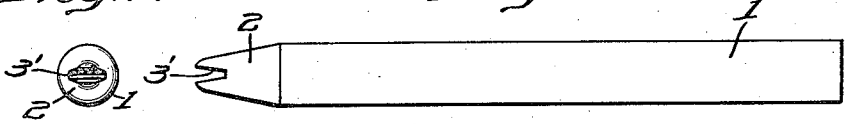
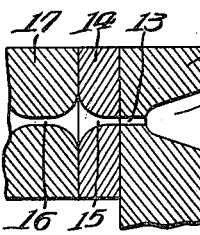
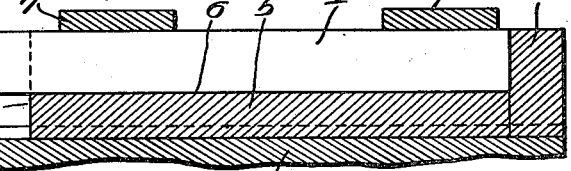
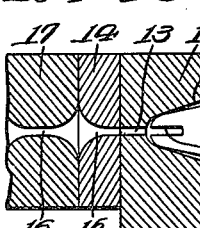
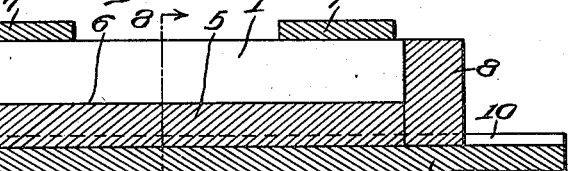
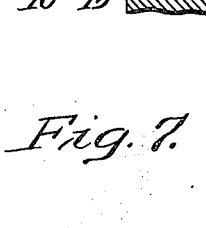
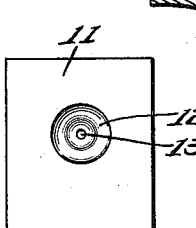
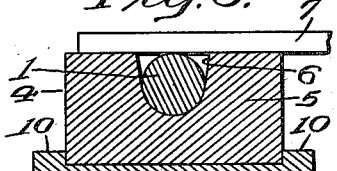
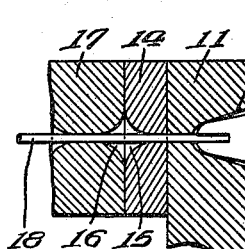
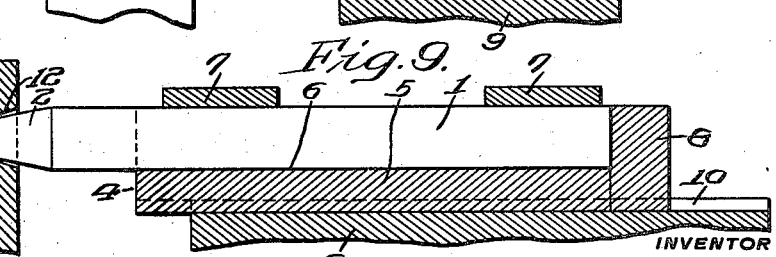
INVENTOR
William W. Moyer.
WITNESS
F. J. Hartman.
BY
Newton P. Blount
ATTORNEYS

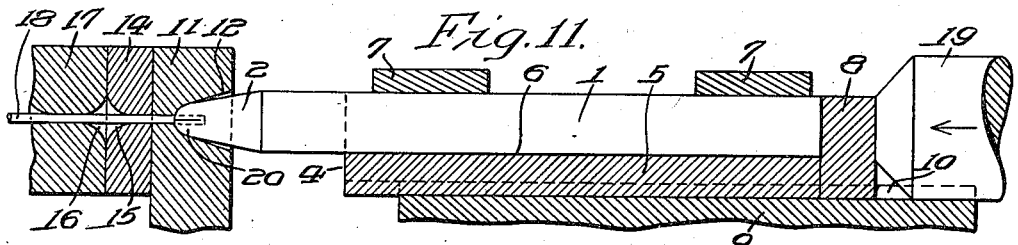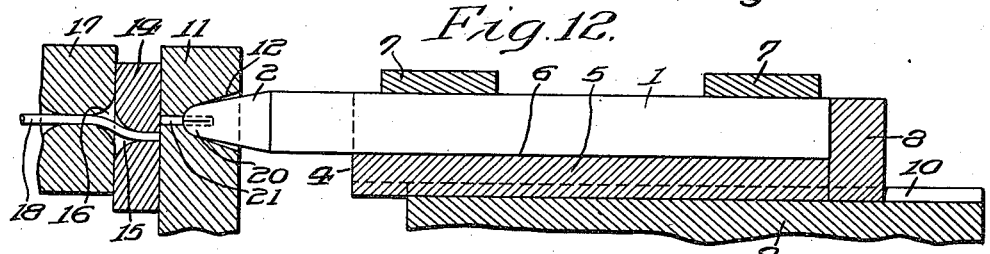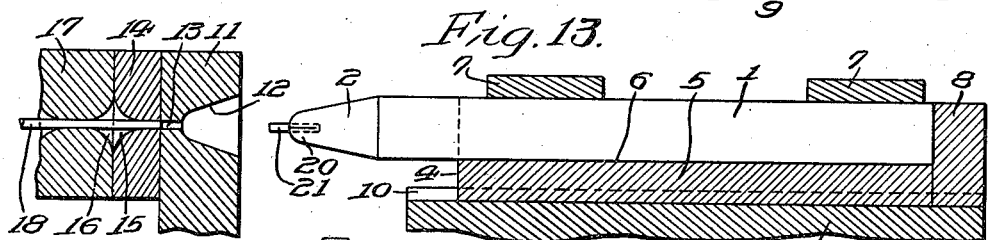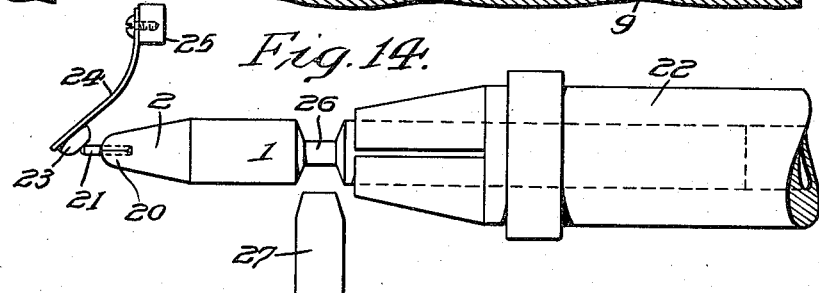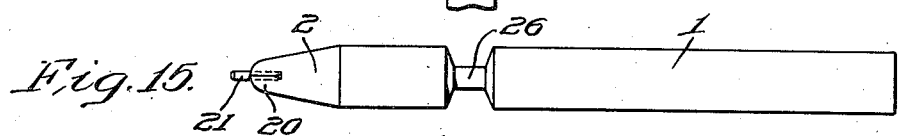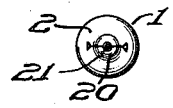

UNITED STATES PATENT OFFICE.

WILLIAM W. MOYER, OF CAMDEN, NEW JERSEY, ASSIGNOR TO VICTOR TALKING MACHINE COMPANY, A CORPORATION OF NEW JERSEY.

STYLUS FOR SOUND-REPRODUCING MACHINES.

1,251,908. Specification of Letters Patent. Patented Jan. 1, 1918.

Application filed January 15, 1916. Serial No. 72,210.

*To all whom it may concern:*

Be it known that I, WILLIAM W. MOYER, a citizen of the United States, and a resident of Camden, county of Camden, and State of New Jersey, have invented certain new and useful Improvements in Styli for Sound-Reproducing Machines, of which the following is a specification.

It has been discovered that tungsten or tungstenic material is peculiarly adapted for styli or needles of sound reproducing machines. A stylus composed of tungsten or tungstenic material exhibits properties differing in a marked degree from those present in styli of other material. Among the characteristics are that a stylus of tungsten or tungstenic material has little injurious effect on the walls of the sound record groove during the reproduction of sound from a record and may be used a large number of times and on different records one after the other without injuriously affecting the walls of the sound record groove. It appears to rapidly wear at first until its sides in engagement with the sound record groove fit and conform to the shape of the groove, after which the wear is negligible or unappreciable throughout the reproduction of sound from the remainder of the groove of the record.

Tungsten is, however, a very difficult material to work, particularly when it is in the form of a wire, the diameter of which is substantially equal to the width of a sound record groove. Tungsten wire is brittle and tends to split. It is also expensive.

Since only a very small portion of a stylus is in actual contact with the walls of the sound record groove in reproducing sound from a record, it is obviously desirable to employ as little of it as possible. If, therefore, a steel shank be provided with a tip of tungsten or tungstenic material to engage and coöperate with the walls of the sound record groove, substantially all of the desirable properties of tungsten or tungstenic materials, as applied to this branch of this art, are utilized, and the present invention is a stylus having a shank of cheaper more easily wrought material, and a record engaging tip on the point or insert of tungstenic material, firmly and permanently united therewith or attached thereto. The object of my invention is to provide a stylus for sound reproducing machines consisting of a tungsten tip or point of very fine tungsten wire of a diameter substantially equal to the width of a sound record groove, inserted into the end of a shank or stem of malleable metal, such as soft steel, the metal of said shank or stem around said tungsten tip or insert being swaged or forcibly compressed into permanent frictional holding engagement with said tungstenic insert.

The shank or body portion of the stylus may be swaged or compressed tightly around the tungsten tip or insert in any suitable manner, but in order that one way of making or constructing this stylus may be disclosed in this application, the steps of one process of making the same will be described below and is illustrated in the drawings forming a part of this application in which the same reference characters are used to designate the same parts throughout the various views.

Figure 1 is a side elevational view of a rod or wire of malleable metal, such as soft steel, tapered and slotted at one end, the same being of the size of an ordinary steel sound reproducing stylus. In actual practice, the shank or body portion is less than one-sixteenth of an inch in diameter, and is about three-fourths of an inch long. For the sake of clearness, the drawings are made on a greatly enlarged scale throughout the various views;

Fig. 2 is an end view of the shank or body portion illustrated in Fig. 1;

Fig. 3 is a side elevational view of a similar but modified form of shank, the slot in the free end thereof being slightly tapered or V-shaped;

Fig. 4 is an end elevational view of the shank shown in Fig. 3;

Fig. 5 shows the shank or body portion illustrated in Figs. 1 and 2 held in a suitable slidable carrier and positioned in alinement with a die of hard steel;

Fig. 6 shows the stylus body or shank together with its carrier, moved to bring the end of the stylus shank into engagement with the die;

Fig. 7 is a front view of the die showing the cupped recess therein and the small central aperture at the bottom thereof through which the tungsten wire is adapted to be threaded;

Fig. 8 is a cross-sectional view on the line 8—8 of Fig. 6 showing the carrier in which the body or shank of the stylus is positioned, held, and moved during the practice of the steps of this process of making the same;

Fig. 9 is a view similar to Fig. 6, but in which the tungsten wire has been inserted through the die and into the slot in the free end of the shank or body portion of the stylus;

Fig. 10 is an end view showing the shank in the position indicated in Fig. 9 with the tungsten wire in position;

Fig. 11 shows the swaging step in which a sharp blow or succession of blows or a high pressure of any kind is imparted to the rear end of the carrier to force the tapered end of the malleable steel wire into the bottom of the cup-shaped die, to swage the tapered end of the shank and to make it conform to the shape of the bottom of the die, to close the slot on the sides of the tungsten wire, and to force the metal on the end of the shank into gripping engagement with the tungsten wire insert;

Fig. 12 indicates the manner in which the tungsten wire is cut or severed at a short distance from the tapered end of the shank;

Fig. 13 shows the carrier moved back to substantially the position shown in Fig. 5 and the tungsten wire tip firmly united with the shank;

Fig. 14 indicates diagrammatically the grinding and rounding off, or beveling of the free end of the tungsten insert to remove any burs or sharp edges which might be thereon and the simultaneous reducing of the diameter of a portion of the steel shank to make it more flexible at that point;

Fig. 15 is a side elevational view of the completed stylus; and

Fig. 16 is an end view of the same.

To make a stylus embodying the invention of this application, a piece of straight wire of substantially the length of an ordinary steel talking machine stylus or needle is tapered or beveled at one of its ends and is provided with a transverse slot at its tapered end to form a shank or body portion 1. This shank or body portion is preferably of a malleable wire, such as soft steel, is about one-sixteenth of an inch in diameter and is substantially three-fourths of an inch long. The shank, shown in Fig. 1, may be made on any suitable screw making machine. The shank or body portion is provided with a tapered end 2 and a transverse narrow slot or channel 3. The width of the slot or channel 3 is very small, as for example, slightly more than six one-thousandths of an inch wide; that is to say, slightly wider than the diameter of the wire that is to be inserted therein, as will be described below.

In Fig. 1, the opposite walls of the slot 3 are parallel and in the modification shown in Fig. 3, the sides slightly diverge, the bottom of the slot or channel being about six one-thousandths of an inch wide.

The shank or body portion 1 (as shown in Figs. 1 and 3) may be then placed in any suitable holder or carrier 4, preferably one which consists of an iron or steel block 5 having a groove or channel 6 in the top face thereof, the width of the said groove 6 being substantially the same as the diameter of the shank or body portion 1 and the bottom of the groove 6 being semi-circular and of a radius equal to the radius of the shank or body portion 1. In this way the under half of the shank or body portion 1 is made to snugly fit into the bottom of the channel or groove 6 throughout the length of the block 5 with its top surface substantially on a level with or a trifle above the top surface of the block 5. Suitable holding straps or fingers 7—7 may be arranged to slide over or clamp down upon the top of the block 5 to firmly hold or clamp the body portion or shank 1 seated in said groove. The said carrier 4 is preferably provided at its rear end with a hard steel anvil 8 made unitary with the block 4 in any suitable manner, and the shank or body portion 1 is held in the carrier with its rear end squarely seated against the block or anvil 8.

The carrier 4 is preferably relatively freely slidable on a basic support 9 between guides 10—10, arranged parallel to the axis of the groove 6 in the block 5. In alinement with the axis of the shank or body portion 1 when it is seated in the groove 6 as above described, is a die 11 of hard steel, the same having a cup-shaped recess 12 in that face nearest the end of the shank or body portion 1. At the bottom of the recess 12 in the die 11 is a small opening 13 in axial alinement with the cup-shaped recess 12. The said opening 13 is of a size to permit a fine tungsten wire of substantially the width of a sound record groove in a commercial sound record tablet to smoothly slide therethrough, the diameter of said wire being substantially five or six one-thousandths of an inch.

Against the rear face of the die 11, is any suitable cutting mechanism, such as a cutting blade 14 bearing tightly against the rear face of the die 11, provided with a passage 15 therethrough and movable transversely to the passage or opening 13 to bring the opening 15 therein into and out of alinement with the opening 13 in the said die 11. The said passage 15 at its end adjacent the die 11 is preferably of the same diameter as the opening 13 and its opposite end is considerably larger and preferably tapers rearwardly into registration with a similar but oppositely tapered opening or passage 16 in the rear block or tungsten wire guide 17.

Said die 11 is preferably rigidly mounted on any suitable rigid base or support. The cup-shaped recess 12 and the openings or passages 13, 15 and 16 are normally in axial alinement with the axis of the shank or body portion 1 when the same is seated in the groove 6 of the block 5 as indicated in Figs. 5 and 6.

Having been positioned and held in the carrier 4 in the manner indicated in Fig. 5, the carrier or holder 4 is moved toward the die 11 to bring the tapered slotted end 2 of the shank or body portion 1 into contact with the interior of the cup-shaped recess 12 of the die 11 as shown in Fig. 6. The end of the shank 1 does not reach or engage the extreme bottom of the cup-shaped recess 12, but the edge of the smaller end of the tapered portion 2 rests against the walls of the recess 12.

A length of tungsten wire is then fed or advanced through the openings 16, 15 and 13 until its free end engages and seats on the bottom of the slot 3. The opening 13 and the width of the slot 3 are preferably slightly greater than the diameter of the tungsten wire 18. The wire just passes freely through the openings 16, 15 and 13. In Fig. 9, the tungsten wire 18 is shown as having been passed through the opening 16 of the tungsten wire guide 17 through the opening 15 in the cutting blade 14 and through the opening 13 in the die 11 and its free end is in engagement with the bottom of the slot 3 of the shank or body portion 1.

The tapered end 2 of the shank or body portion 1 is then swaged around the tungsten wire insert. This may be done by striking the anvil 8 a sharp blow with a hammer 19 of any suitable type actuated in any suitable manner by any suitable means. The tapered end 2 of the shank or body portion 1 of the stylus is thus driven into the bottom of the cup-shaped recess 12 in the die 11 and swages the tapered end 2 to the tungsten wire. The tapered end is caused to conform to the curved bottom of the recess 12. The slot 3 on each side of the tungsten wire 18 is closed and the metal of the tapered end is compressed tightly against the tungsten wire insert. In this manner the free end of the tungsten wire 18 is firmly and rigidly secured to and made substantially unitary with the tapered end 2 of the shank or body portion 1. When the blow is struck by the hammer 19 against the anvil 8 and is thereby imparted to the shank or body portion 1, the tungsten wire 18 is substantially free to slide or move with the shank 1, sliding slightly through the openings 13, 15 and 16. The tungsten wire is not held clamped in the die 11 nor in the cutting blade 14 nor in the tungsten wire guide 17. The tungsten wire is preferably held evenly pressed against the bottom of the channel 3 when the blow is imparted to the shank 1 by the hammer 19 so that it is not bent or broken by the advance of the stylus shank. As a matter of fact, the advance of the carrier or holder 4, in the shank or stylus 1, toward the die 11 as the result of the blow by the hammer 19 is very slight, but it is sufficient to shape the tapered end 2 of the shank or body portion 1 and make it conform to the shape of the bottom of the cup-shaped recess 12 and to close the slot 3 substantially completely around the tungsten wire 18 and to force the malleable metal of the tapered end 2 into very tight engagement with the tungsten wire insert 18.

The tapered end 2 of the shank or body portion of the stylus having thus been swaged around the free end of the tungsten wire, the cutting blade 14 may then be given a transverse motion to shear off the tungsten wire a short distance from the swaged and tapered end 20 of the shank or body portion 1. The distance from the bottom of the cup-shaped recess 12 to the rear face of the die 11 is made equal to the distance that the tungsten wire is to protrude from the end of the shank or body portion 1 in the finished stylus. To prevent the cutting of the tungsten wire between the cutting blade 14 and the tungsten wire guide or block 17, the passages 15 and 16 are tapered to a larger diameter than that of the wire in order to permit the wire to freely bend without breaking or severing as indicated clearly in Fig. 18.

After the blade 14 has severed the tungsten wire 18, the carrier or holder 4 is moved rearwardly away from the die 11, carrying with it the substantially completed stylus which now comprises a shank or body portion 1 having a tapered end 2, the outer extreme end 20 of which is tightly swaged around and firmly grips and holds a tungsten wire tip 21, the diameter of which tip is substantially equal to the width of the sound record groove. To round off the sharp edge of the free end of the tungsten wire tip 21 and to thereby remove any bur which might be on said end as a result of the shearing of the tungsten wire, the shank or body portion 1 of the stylus may be placed in any suitable rapidly rotating chuck 22 and the free end of the tungsten tip 21 projecting therefrom may be brought against any grinding or abrasive agent 23, such as a piece of Arkansas stone on the free end of a spring 24 secured to any suitable support 25. In this manner the end of the tungsten tip 21 may be beveled or rounded to approximate the shape of a sound record groove in transverse cross-section.

Simultaneously with or subsequent to the grinding and rounding of the tungsten tip 21, the shank or body portion of the stylus may be provided with a reduced portion 26 by turning down the shank to as small a diameter as may be desired with any suitable metal cutting tool 27.

For loud tone or full tone needles or styli, this step of providing the shank with a reduced portion 26 may be omitted.

When the end of the shank 1 is provided with the tapered slot or recess 3', the uniting of the shank and tungsten tip may be performed in the identical manner as that above described in connection with the shank shown in Fig. 1. The making tapered of the walls thereof so that at the outer end of the channel 3' the width is greater than the diameter of the tunsten wire, facilitates the threading of the wire into the channel 3', particularly if there be a slight bend in the tungsten wire which might otherwise cause it to strike against the small end of the conical portion rather than to enter the groove. The metal around the small end of the tapered portion 2 of the shank shown in Fig. 3 appears to more readily bend around the tungsten wire insert and conform to the interior of the die. It also appears to more completely, if possible, close the slot on each side of the tungsten wire insert.

A side elevational view of the finished stylus is shown in Fig. 15. An end view of the same is shown in Fig. 16. It is to be observed that the slot 3 of the original shank or body portion 1 has been tightly closed by the swaging process and that only a slight mark appears on the tapered surface of the shank or body portion at the bottom of what was the groove or channel 3 or 3'. All the metal of the swaged end is tightly closed around the tungsten wire and the tungsten wire is substantially unitarily united with the swaged end of the shank or body portion 1.

The stylus of this application, however, is not to be construed as being limited to any particular mechanism for performing the steps above set forth and the tapered end 2 of the shank 1 may be forced into the die in any suitable manner either by a single sharp blow or by a series of blows or by a slow substantially continuously high pressure provided the tapered end of the shank or body portion is thereby made to inclose the tungsten insert so firmly and tightly as to make the insert substantially unitary with the shank or body portion.

Instead of a parallel sided transverse slot or channel 3, or a tapered substantially V-shaped slot 3', the said end 2 may be provided with an axial hole of a diameter slightly greater than the diameter of the tungsten wire and the tapered end 2 may be swaged around the tungsten wire insert in the same manner as has been above described, but this method of making the stylus of this application is not the preferred one, because of the difficulty of threading a tungsten wire into so small an opening in the end of the shank and because it is more difficult to swage the end of the stylus so made sufficiently to compress it into tight unitary engagement with the insert when the shank is provided with slots 3 or 3' first above described.

Having thus described my invention, what I claim and desire to protect by Letters Patent is:

1. A stylus for sound reproducing machines comprising a tungsten wire tip and a shank of malleable metal swaged over and around said tip.

2. A stylus for sound reproducing machines comprising a shank of malleable metal and a tip of tungsten wire unitarily united to said shank by swaging.

3. A stylus for sound reproducing machines comprising a shank and a tip of tungsten wire projecting from the end of said shank, the metal of said shank around said tungsten wire being swaged into permanent frictional holding engagement with said wire.

4. A stylus for sound reproducing machines comprising a shank of malleable metal and an insert of tungsten wire projecting from the end of said shank, the metal of said shank surrounding said insert being forced into permanent frictional holding engagement with said insert.

5. A stylus for sound reproducing machines comprising a shank of malleable metal and a tungsten wire insert permanently secured to said shank by swaging, said tungsten wire being of a diameter not substantially greater than the width of a sound record groove in a commercial sound record tablet.

6. A stylus for sound reproducing machines comprising a shank and a tip of tungsten wire permanently secured to said shank by swaging, the diameter of said tungsten wire being not substantially more than six one-thousandths of an inch.

In witness whereof, I have hereunto set my hand this thirteenth day of January, 1916.

WILLIAM W. MOYER.